Sept. 1, 1925.  O. A. GARLAND  1,551,987
BRAKE MECHANISM
Filed March 3, 1925  2 Sheets-Sheet 1
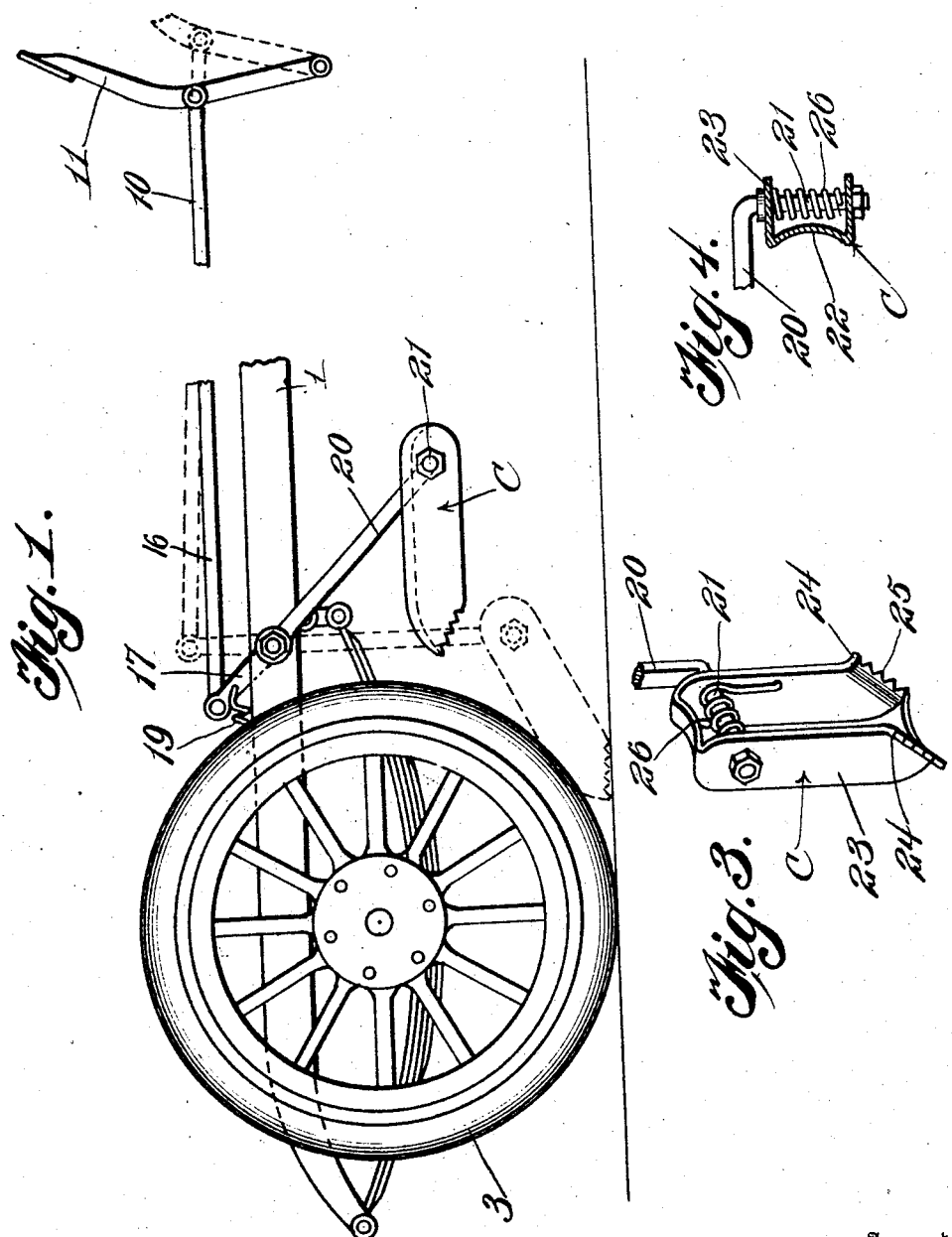
Inventor
Oscar A. Garland
By Watson E. Coleman
Attorney

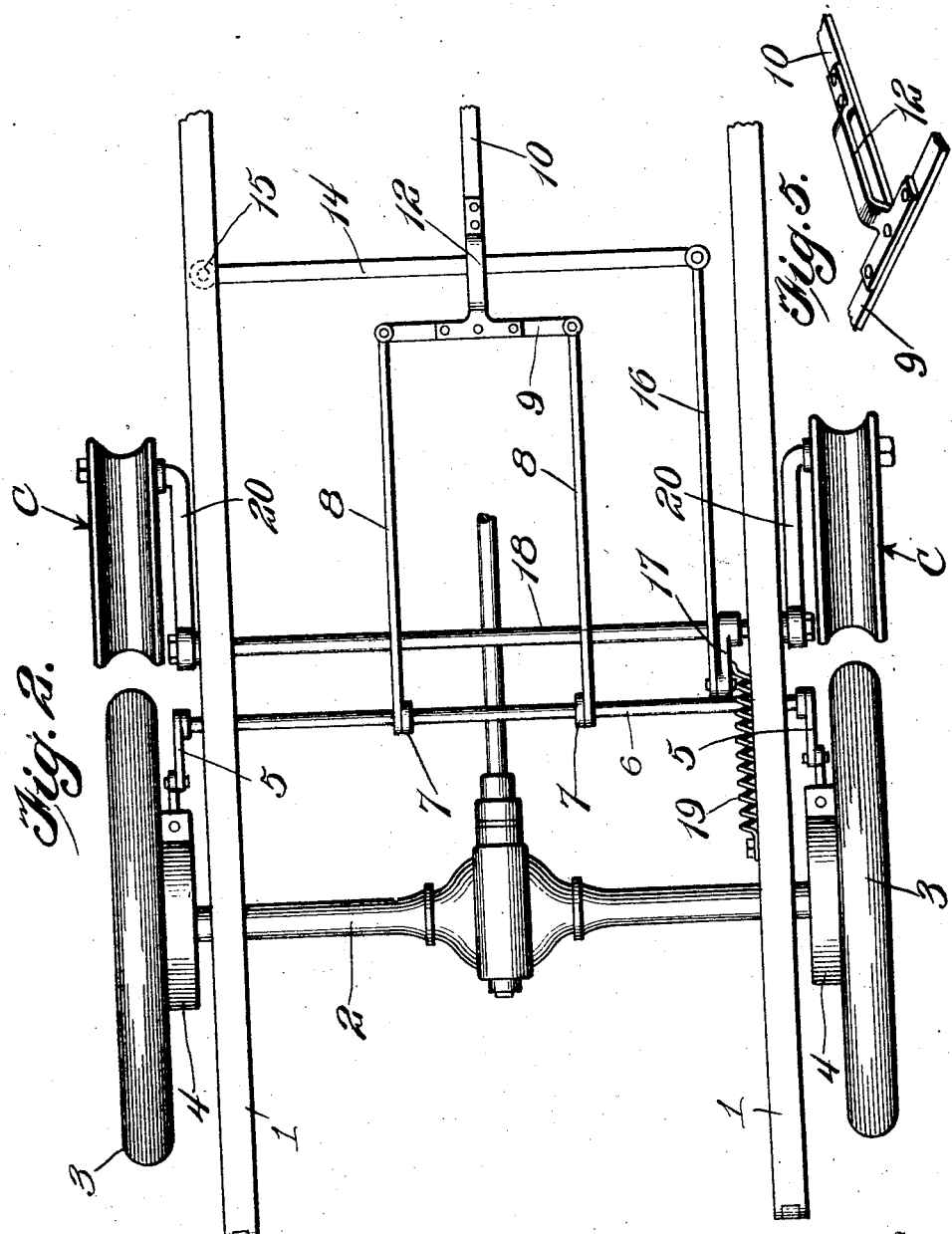

Patented Sept. 1, 1925.

1,551,987

UNITED STATES PATENT OFFICE.

OSCAR A. GARLAND, OF HOT SPRINGS, ARKANSAS.

BRAKE MECHANISM.

Application filed March 3, 1925. Serial No. 12,999.

*To all whom it may concern:*

Be it known that I, OSCAR A. GARLAND, a citizen of the United States, residing at Hot Springs, in the county of Garland and State of Arkansas, have invented certain new and useful Improvements in Brake Mechanisms, of which the following is a specification, reference being had to the accompanying drawings.

This invention relates to certain improvements in brake mechanisms and has relation more particularly to a mechanism of this general character especially designed and adapted for use in connection with motor driven vehicles or the like, and it is an object of the invention to provide a mechanism of this kind with an auxiliary brake adapted to be engaged underneath of the rear or drive wheels of the vehicle to bear forcibly upon the roadway or the like.

It is also an object of the invention to provide a novel and improved mechanism of this general character wherein is employed auxiliary brakes for certain of the wheels together with an operating means for said auxiliary brakes becoming effective after the main brakes have been initially set.

Another object of the invention is to provide a mechanism of this kind including band brakes for the rear or drive wheels together with chocks coacting with said wheels to provide an auxiliary braking means wherein a pedal common to both sets of brakes is employed for operating the same.

The invention consists in the details of construction and in the combination and arrangement of the several parts of my improved brake mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in side elevation illustrating a braking mechanism constructed in accordance with an embodiment of my invention, a second position of certain of the parts being indicated by broken lines;

Figure 2 is a view in top plan of the structure as illustrated in Figure 1 with certain of the parts omitted;

Figure 3 is a fragmentary view in perspective illustrating one of the chocks as herein employed;

Figure 4 is a view in cross section taken through the chock as illustrated in Figure 3, the parts directly associated therewith being in plan;

Figure 5 is a transverse view in perspective illustrating the guide loop for the operating beam or rod.

As disclosed in the accompanying drawings, the side members 1 of an automobile frame or chassis are operatively connected in a well known manner with the rear housing 2 associated with the rear or drive wheels 3. Each of the wheels 3 has coacting therewith a band brake 4 under control of a rock arm 5 carried by a shaft 6. The shaft 6 is rotatably supported by the side members 1 and at predetermined points intermediate said side members, the shaft 6 is also provided with the upstanding rock arms 7 to each of which is operatively engaged the forwardly directed arm 8 also operatively connected with a cross head 9. This cross head 9 is carried by a lever or rod 10 which leads to and is operatively engaged with the foot pedal 11 so that upon requisite pressure being imposed upon the pedal 11, the band brake 4 will be caused to have requisite braking action with respect to the wheel 3.

The rod 10 at a point closely adjacent to the cross head 9 has attached thereto a guide loop 12 through which is disposed a beam or rod 14. This rod or beam 14 is disposed transversely of the frame or chassis and has one end portion pivotally connected, as at 15, to a side member 1 while the opposite end portion of the beam or rod has pivotally engaged therewith an end portion of a rearwardly disposed arm 16 which is operatively engaged with an upstanding rock arm 17. This rock arm 17 is carried by a shaft 18 disposed transversely of the frame or chassis and rotatably supported by the side members 1 and extending therebeyond. The arm 17 is constantly urged rearwardly and downwardly through the medium of the retractile coil spring 19 having one end portion attached to the arm 17 and the opposite end portion anchored to the adjacent side member 1. Each extended end portion of the shaft 18 is provided with a depending rock arm 20 terminating at its outer or lower end portion in the outstanding and laterally disposed spindle 21 providing a mounting for a chock C, said chock being adapted to have swinging movement about the spindle 21.

As herein disclosed, the chock C is substantially U-shaped in cross section with its intermediate or base portion 22 upwardly disposed and said intermediate portion 22 being concave in cross section whereby a suitable channel is provided entirely therealong to receive the peripheral portion of a wheel 3 or more particularly the applied tire when the chock is in a position to serve as an auxiliary brake.

The outer end portions of the side members 23 of each of the chocks C are disposed outwardly to provide the outstanding angular extensions 24 having their free ends provided with the penetrating teeth 25 so that when the chock C is in working position effective contact with the road surface is assured and thereby materially increasing the efficiency of the chock.

Surrounding each of the spindles 21 and positioned between the side members 23 of the chock C mounted on such spindle is a coil spring 26 having one extremity attached or secured to the spindle 21 with the opposite end portion of the spring 26 secured to a side member 23 of the chock. By this means, the outer or free end portion of the chock C is urged upwardly as illustrated in full lines in Figure 1 so that when the chock is in an inoperative position with respect to a wheel 3 it is also effectively maintained out of contact with the roadway or other surface.

In practice, initial pressure upon the pedal 11 operates to set the band brakes 4, the guide loop 12 permitting such initial setting to be effected independently of the chock C. Upon additional pressure being imposed upon the pedal 11, the rear end of the guide loop 12 will contact with the rod or beam 14 resulting in throwing of the arms 20 downwardly to bring the chock C in contact with the wheels 3 whereby said chock C serves effectively as an auxiliary braking medium.

From the foregoing description it is thought to be obvious that a brake mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. The combination with the wheels of a vehicle, a brake mechanism therefor, and an operating means for said mechanism; of a chock for each of said wheels, means for supporting said chocks for movement toward or from the wheels, and means operated by the operating means for the brake mechanism for moving said chocks into braking position.

2. The combination with the wheels of a vehicle, a brake mechanism therefor, and an operating means for said mechanism; of a chock for each of said wheels, means for supporting said chocks for movement toward or from the wheels, and means operated by the operating means for the brake mechanism for moving said chocks into braking position, said second named means remaining inoperative during the initial operation of the first named means.

3. The combination with the wheels of a vehicle, a brake mechanism therefor, and an operating means for said mechanism; of a chock for each of said wheels, means for supporting said chocks for movement toward or from the wheels, means operated by the operating means for the brake mechanism for moving said chocks into braking position; and means for normally maintaining the chocks in an inoperative position.

4. In combination with a body and supporting wheels therefor, a brake mechanism for said wheels, an operating means for said mechanism, a rock shaft supported by the body, arms depending therefrom, chocks pivotally engaged with said arms, and disposed in a direction toward the wheels, means for normally swinging the chocks upwardly independently of the arms, and means operated by the operating means for the brake mechanism for swinging the arms in a direction to bring the chocks into braking position with respect to the wheels.

5. In combination with a body and supporting wheels therefor, a brake mechanism for said wheels, an operating means for said mechanism, a rock shaft supported by the body, arms depending therefrom, chocks pivotally engaged with said arms and disposed in a direction toward the wheels, means for normally swinging the chocks upwardly independently of the arms, means operated by the operating means for the brake mechanism for swinging the arms in a direction to bring the chocks into braking position with respect to the wheels, and automatic means coacting with the shaft for maintaining the chocks in inoperative position.

6. In combination with a body and supporting wheels therefor, a braking mechanism for the wheels, a rod for operating said mechanism, means for imparting requisite movement to the rod, a guide loop carried by the rod, a beam pivotally connected to the body and extending through the guide loop, a rock shaft, an operative connection between the rock shaft and beam whereby movement of the beam in one direction imparts rocking movement to the shaft, and chocks operatively supported by the shaft, said chocks moving into braking position with respect to the wheels upon rocking of the shaft upon movement of the beam.

7. In combination with a body and supporting wheels therefor, a braking mechanism for the wheels, a rod for operating said mechanism, means for imparting requisite movement to the rod, a guide loop carried by the rod, a beam pivotally connected to the body and extending through the guide loop, a rock shaft, an operative connection between the rock shaft and beam whereby movement of the beam in one direction imparts rocking movement to the shaft, and chocks operatively supported by the shaft, said chocks moving into braking position with respect to the wheels upon rocking of the shaft upon movement of the beam, said guide loop permitting independent movement of the rod before the beam is moved by the rod.

In testimony whereof I hereunto affix my signature.

OSCAR A. GARLAND.